United States Patent

[11] 3,526,180

[72] Inventors Paul Fahlenberg
Baierbrunn, near Munich, Germany;
Rudolf Lang, Grafing-Bahnhof, Germany
[21] Appl. No. 739,776
[22] Filed June 25, 1968
[45] Patented Sept. 1, 1970
[73] Assignee Compur-Werk Gesellschaft mit
beschrankter Haftung & Co.
Munich, Germany
a firm of Germany
[32] Priority July 4, 1967
[33] Germany
[31] No. 1,597,147

[54] PHOTOGRAPHIC CAMERA WITH INTERCHANGEABLE SHUTTER
11 Claims, 4 Drawing Figs.
[52] U.S. Cl. ................................................. 95/53, 95/63
[51] Int. Cl. ............................................... G03b 9/08
[50] Field of Search ...................................... 95/53, 58, 59, 63

[56] References Cited
UNITED STATES PATENTS
3,357,332 12/1967 Helber et al. .................. 95/53

*Primary Examiner*—Norton Ansher
*Assistant Examiner*—Richard L. Moses
*Attorney*—Charles Shepard and Stonebreaker and Shepard ABSTRACT: A photographic camera has an interchangeable shutter, at least one variable factor or value of which is settable by electronic control means mounted externally of the shutter and adapted to be used with any one of the various interchangeable shutters. Different shutters adapted for interchangeable use with the camera may have different ranges of whatever value or factor (e.g., shutter speed or diaphragm aperture) is settable by the electronic control arrangement. The electronic control should be capable of setting throughout the entire settable range of every interchangeable shutter which may be used with the camera, which range may be greater than that of certain individual shutters which may be used with the camera. To avoid faulty operation resulting from an attempt to set a variable factor which is within the range of the electronic control unit but not within the range of the particular shutter connected thereto at the moment, means is provided for producing a warning signal or a locking action, or both, when the operator attempts to set a value which is not within the permissible range of the particular interchangeable shutter then being used.

3,526,180

PHOTOGRAPHIC CAMERA WITH INTERCHANGEABLE SHUTTER

BACKGROUND OF THE INVENTION

Interchangeable shutters for use on the same camera are known in the art. If each individual shutter is equipped with its own individual controls or setting members, such as rotatable rings for setting shutter speed and diaphragm aperture, then there is no particular problem posed by the fact that one shutter may have a different range of settable values from another. But if it is desired to use electronic setting means for setting some variable factor of the shutter, such as shutter speed or diaphragm aperture, then it is not economically feasible to duplicate this electronic control mechanism in each individual interchangeable shutter. It is more practical to have a single electronic control unit separate from the shutter (mounted, for example, in the body of the camera, or in a convenient small housing or casing separate from the shutter) and usable for controlling the variable factor of any selected one of the various shutters adapted to be interchangeably used with the particular camera in question.

The various shutters adapted for use with the camera may, however, have different ranges of settable values. For example, if shutter speed is the variable factor which is to be set by the electronic control arrangement, a first shutter may have a range of settable values from 1/30th of a second to 1/500th of a second, whereas a second shutter interchangeably usable with the same camera may have a settable range only from 1/30th of a second to 1/125th of a second. The electronic control arrangement must be capable of taking advantage of the entire settable range of any shutter which can be used with this electronic control arrangement. But to avoid faulty operation, there should be means to minimize or prevent the use of the electronic control unit for setting a value in excess of the available range of values in the particular shutter connected to the control unit at the moment. For example, if the control unit, capable of setting to a speed as fast as 1/500th of a second, is actually connected to an interchangeable shutter whose fastest speed is 1/125th of a second, then there should be means to prevent operating the control unit in such a way as to call for a speed of 1/250th or 1/500th of a second, which speeds are obviously impossible with the particular shutter then being used.

An object of the invention is to provide a generally improved and more satisfactory control unit for electrically controlling a variable factor of any one of a plurality of shutters which may be used interchangeably with the control unit.

Another object is the provision of a control unit and shutter combination so designed that when it is attempted to use the control unit to set a value outside the permissible range of values of the particular shutter then being used, the operator is adequately warned that such a setting is impossible.

A still further object is the provision of a control unit in combination with an interchangeable shutter, so designed that when the control unit is operated to set a value which cannot be set on the shutter, the operator is given a warning signal, or some part of the operating mechanism is locked, or both.

BRIEF DESCRIPTION OF THE DRAWINGS

In the accompanying drawings, which are incorporated herein by reference and constitute a material part of the disclosure, showing exemplary embodiments of the invention:

FIG. 4 is a plan of a detail of the mechanism shown in FIG. 1.

DESCRIPTION OF THE PREFERRED EMBODIMENTS

Figure 1:
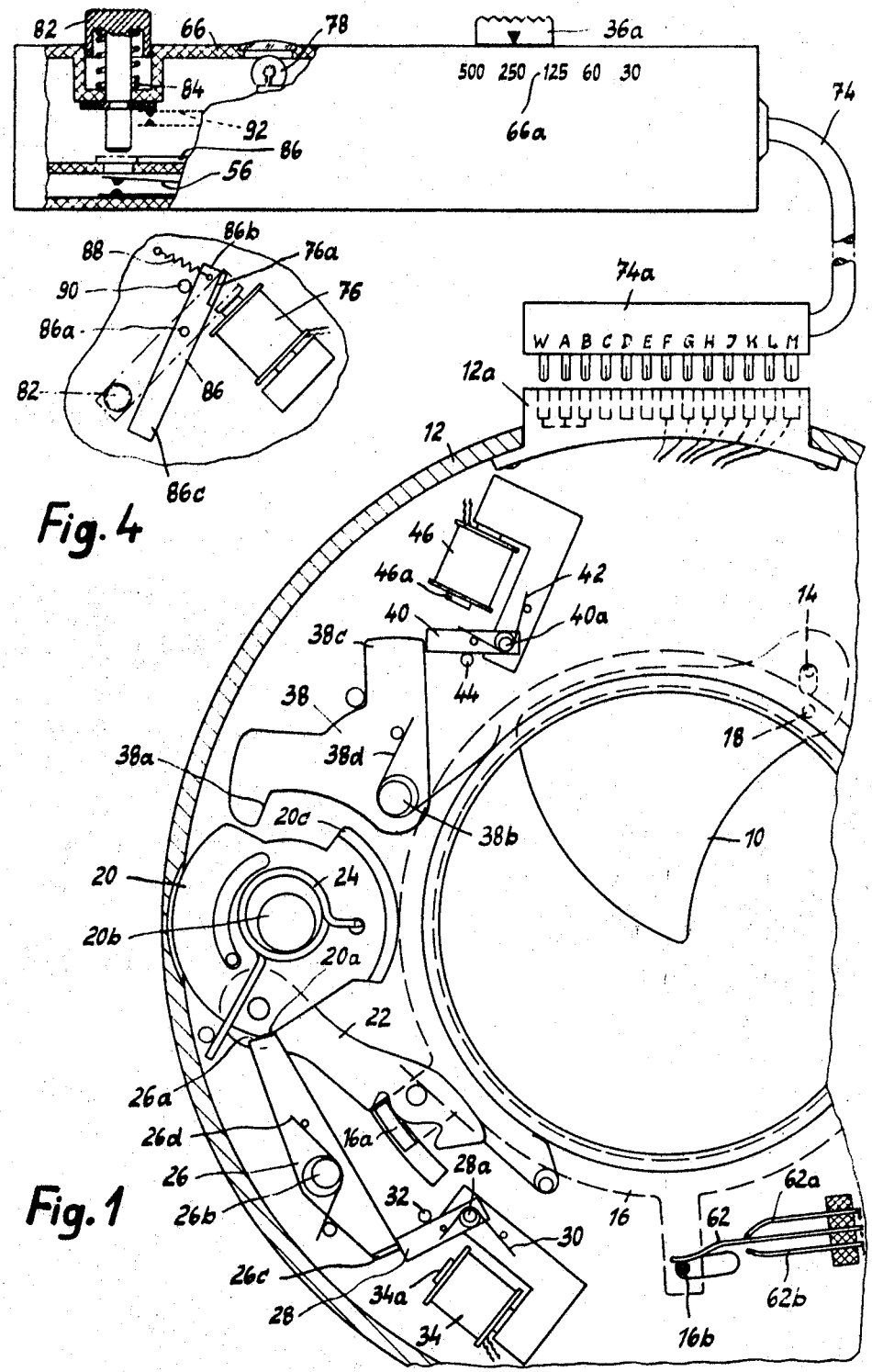
FIG. 1 is a front view of certain parts of a shutter and an associated control unit, according to a preferred embodiment of the invention, with parts broken away and with various parts not essential to an understanding of the invention omitted, the main parts of the shutter being shown in tensioned or cocked position.

Referring first to the mechanical construction as illustrated in FIG. 1, the shutter has a number of conventional shutter blades 10, usually about five blades being employed but only one is illustrated for the sake of clarity. The blades are mounted in the usual annular casing or housing 12, each blade engaging a pin 14 in the shutter housing, and also being connected to the usual rotatable blade ring 16 by means of a pivot pin 18 in such manner (well known in the art) that when the blade ring 16 moves to its clockwise limit of rotation (this being the position shown in FIG. 1) the shutter blades are closed, and when the blade ring 16 moves counterclockwise from this position, the blades are opened.

The blade ring 16 is rotated first in a blade opening direction and then in a closing direction by a main driving member of "master member" 20 which is drivingly coupled in known manner, through a link 22, to the arm 16a on the blade ring 16. The master member 20 is biased in a counterclockwise direction by a main spring or master spring 24. It is cocked or tensioned by turning its shaft or spindle 20b which extends out through the back wall of the shutter housing and is adapted to be coupled in known manner to the film feed mechanism or other suitable operating part of the camera, so that when the film is fed forwardly, the master member will be turned clockwise from its run-down position to its cocked or tensioned position. It is held in this cocked or tensioned position by an intermediate latch lever 26, the end face 26a of which engages a surface 20a on the master member 20.

The intermediate latching lever 26 is pivoted intermediate its ends on the pin 26b. The second arm 26c of this lever cooperates with an armature 28 pivoted at 28a and urged by a light spring 30 in a clockwise direction against a limiting stop pin 32. The electromagnet 34, having a pole piece 34a, is in position to attract the armature 28 when the magnet is energized by flow of current through its winding, with sufficient force to overcome the light spring 30 and draw the armature to a position where it does not obstruct the end 26c of the latch lever 26. The pressure of the surface 20a of the master member 20 against the somewhat oblique or inclined end 26a of the lever 26 will displace the lever 26 in a counterclockwise direction on its pivot 26b, when the armature 28 has been attracted to the electromagnet 34 so that it no longer obstructs the end 26c. The pressure of the master member exerts sufficient force on the lever 26 to overcome the light restoring spring 26d which tends to turn the lever 26 in a clockwise direction.

The shutter housing 12 also contains an intermediate member 38 in the form of a two-armed bellcrank lever pivotally mounted on the fixed pin 38b, and having a nose 38a which normally lies in the path of travel of a shoulder 20c on the master member 20. The second arm 38c of this bellcrank lever 38 is urged against a fixed stop by a light restoring spring 38d, and is latched in this position by a latching armature 40 pivoted at 40a and urged by a light spring 42 in a counterclockwise direction against a fixed stop pin 44. The electromagnet 46 has a pole piece 46a in position to attract the armature 40 when the electromagnet 46 is energized by flow of current, so as to move the armature 40 to a non-obstructing position with respect to the arm 38c of the intermediate member 38, so that the shoulder 20c of the master member may, during its running-down movement, thrust the nose 38a aside and continue its movement so as to close the shutter blades.

Figure 2:
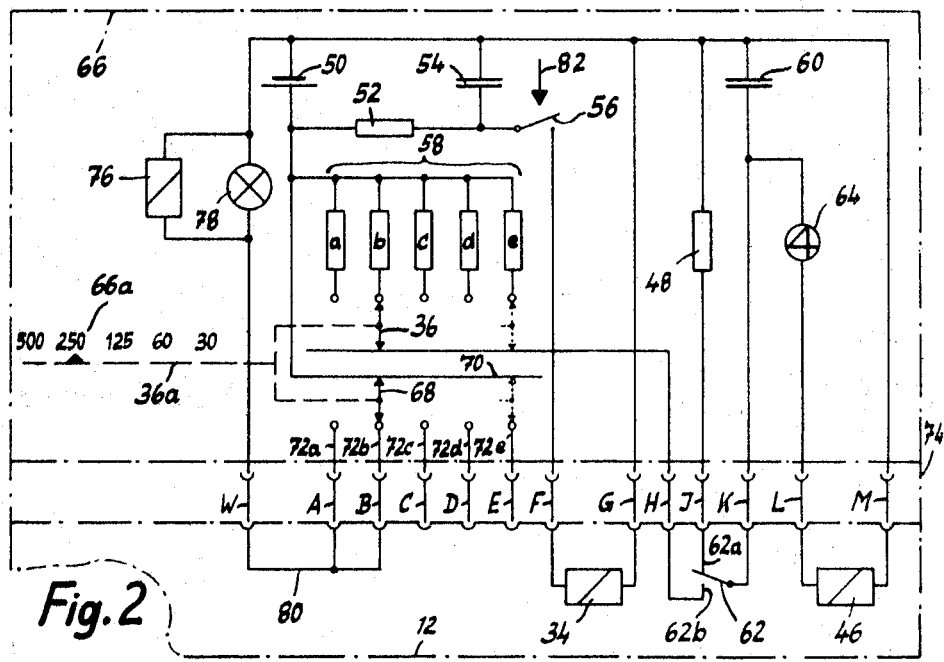
FIG. 2 is a schematic wiring diagram of an electrical control unit according to one embodiment of the invention.

According to the present invention, the two electromagnets 34 and 46 are connected in the circuitry of an electronic trigger and delay arrangement having the parts and connections illustrated schematically in FIG. 2. The arrangement comprises a suitable source of current such as the battery 50 operatively connected as shown to the resistance 52 and capacitor 54. By means of the connections illustrated, the capacitor 54 is adapted to be connected, through a switch 56, to the electromagnet winding 34. When the switch 56 is closed, the charge of the capacitor 54 will be discharged through the winding of the magnet 34, energizing this magnet and thereby attracting the armature 28 so that the latch lever 26 is released and the master member 20 can begin its running down movement to initiate the exposure cycle.

Another electrical resistance or group of resistances 58, having separate values indicated respectively at a, b, c, d, and e, can be manually adjusted to the required setting or value by a manually movable slider 36. This resistance 58, in combination with the capacitor 60 which is charged from the battery 50 through the resistance 68, constitutes the time-determining or shutter speed determining RC-member (or resistance-capacitance member) of the arrangement.

The arrangement further includes a changeover switch 62, and four-layer diode 64 operatively connected as shown to the winding 46 of the second electromagnet which, as previously explained, controls the latching armature 40 of the intermediate member 38 which delays the running down of the master member in an intermediate position at which the shutter blades are fully open.

The changeover switch 62 is preferably operated by a pin 16b on the blade ring 16, in the manner shown in FIG. 1. When the blade ring is in its clockwise limit position, with the blades closed, the pin 16b holds the switch member 62 against the contact 62a (compare with FIG. 2) but when the blade ring 16 swings in a counterclockwise direction sufficiently far to open the blades fully, the pressure of the pin 16b on the resilient switch member 62 is relieved so that the member 62 swings away from the contact part 62a and makes contact with the contact member 62b. The contact member 62a is connected, as shown in FIG. 2, to one side of a further resistance 48, the other side of which is connected to one side of the battery 50. The other switch contact member 62b is connected, as shown, through the adjustable slide 36 to one or another of the different value resistance portions 58, and through this resistance 58 to the other side of the battery 50. The slide 36 is connected to and operated by a manual setting member schematically shown at 36a which, as shown in the upper part of FIG. 1, is conveniently in the form of a linearly movable finger piece 36a slidable on a small supplementary casing or housing 66. A shutter speed scale or time scale 66a is graduated in terms of shutter speed or exposure time, and is read in conjunction with an index mark on the finger piece 36a. In the embodiment illustrated, the scale 66a is graduated in conventional graduations for various shutter speeds from 1/30th to 1/500th of a second.

The above mentioned small housing 66 is preferably in the form of a relatively small control box separate from the shutter housing 12, and it may also be separate from the camera, although it may be part of or be attached to the camera body. The housing 66 accommodates the principal elements of the electronic arrangement. A second slider 68 is rigidly connected with the slider 36 to move therewith. This slider 68 travels, on one hand, along a contact strip 70, and on the other hand can be brought into contact with one or another of the contact points or contact members 72a to 72e.

The shutter housing 12 is interchangeably mounted on the camera body by conventional mounting means, such as the bayonet joint arrangement commonly used for mounting a shutter or a lens on a camera. The camera body itself is conventional and the details thereof are not important for purposes of the present invention, so that the camera body and the bayonet joint connection or other form of connection are not here illustrated. Since the shutter is interchangeably mounted on the camera, various different shutters of different types can be selectively placed on the camera and can be used with a single control box 66. The various shutters may have different features, such as different lenses mounted in them, and may have different maximum or minimum shutter speeds or exposure times. The range of shutter speeds inscribed on the shutter speed scale 66a must be sufficiently great to cover all shutter speeds on all of the interchangeable shutters which are to be used with the control box 66, but these speeds would not necessarily apply to any one individual shutter, since any particular one of the shutters might have a range somewhat less than the range of the scale 66a. According to the invention, the control arrangement within the box 66 is automatically adapted to the particular shutter with which it is used at any particular time, in the following manner.

The shutter housing is provided with an electric socket 12a (FIG. 1) for receiving the multiple prongs of an electrical plug 74a connected through a flexible cable 74 to the electric parts within the control box 66. The plug 74a has individual prongs indicated by the respective letters A through M and W. The prongs and the corresponding individual sockets into which the prongs fit, are electrically connected to the respective elements or components within the control box 66 and the shutter housing, in the manner indicated in the wiring diagram, FIG. 2. In the case of a shutter which cannot operate according to all of the shutter speeds on the shutter speed scale 36a, the prong sockets corresponding to these speeds which cannot be operated are connected to each other and to a warning or stop circuit which comprises an electromagnet 76 and a warning lamp 78. For example, let it be assumed that the prong A is the one which is connected into the circuit (through the slider 68) when the manual control member 36a is set on the scale 66a for a shutter speed of 500 (i. e., 1/500th of a second) and that the prong B is operatively connected into the circuit when the manual control is set for a speed of 250, and so on. Let it be further assumed that the particular shutter which is now being used has a maximum shutter speed of 125 and so is incapable of making exposures at 250 or 500. In such a case, the prong sockets corresponding to the impossible speeds (that is, the sockets of the prongs A and B) are connected by the conductor 80 to each other and to the socket of the prong W, which prong leads to the previously mentioned electromagnet 76 and warning lamp 78.

The starting switch 56, the closing of which initiates the exposure cycle, may be closed by pressing on a plunger 82 (FIG. 1) which is axially displaceable in the control box 66 against the action of a light spring 84. A double armed stop lever or safety locking lever 86 (FIG. 4) is pivoted at 86a within the control box and is urged by a spring 88 against an abutment pin 90. The lever carries an armature 76a attracted by the electromagnet 76 when the latter is energized, to swing the lever 86 against the force of the spring 88. When it is attracted by the armature, the lever 86 swings to a position obstructing the switch closing plunger 82, so that the plunger can only be moved a short distance and cannot be moved far enough to close the starting switch 56. When the magnet 76 is not energized, the spring 88 swings the lever 86 to a position out of the path of travel of the plunger 82.

The shutter and control parts above described operate as follows: Turning the spindle 20b of the master member 20 in a clockwise direction loads or tensions the master spring 24 and brings the master member 20 to the tensioned or cocked position illustrated in FIG. 1, so that the end face 26a of the intermediate latch lever 26 snaps into position behind the cooperating abutment surface 20a of the master member, and the armature 28 of the magnet 34 snaps into its latching position with respect to the intermediate lever 26. At the same time, the armature 40 of the magnet 46 snaps into position to latch the arm 38c of the bellcrank lever 38. Thus the master member is held against any running down movement, and the shutter blades are kept in their closed position, unless possibly they are opened for interim inspection of the image by other mechanism of known form which is not part of the present invention. In this condition of the parts, the electromagnet windings 34 and 46 are dead or de-energized because the switch 56 is open and the switch 62 is against the contact member 62a and separated from the contact member 62b. Under these conditions, the capacitor 54 is charged from the battery 50, while the capacitor 60 is discharged.

Now it will be assumed that a photograph is to be taken with an exposure of 1/30th of a second. This selected exposure time or shutter speed is set by adjusting the finger piece 36a so that the index mark thereon is opposite the graduation 30 of the scale 66a. This brings the contact slides 36 and 68 to the extreme right hand positions shown in broken lines in FIG. 2. When this has been done, the shutter can be released or triggered to initiate the exposure by pressing the plunger or button 82, thereby closing the switch 56.

As soon as the switch 56 is closed, the capacitor 54 discharges through the winding of the electromagnet 34 so that this electromagnet pulls on its armature 28, thereby releasing the intermediate lever 26. Because of the inclination of the face 26a of this lever, the pressure of the master member part 20a causes the lever 26 to swing in a counterclockwise direction until the master member 20 can run down freely in its counterclockwise direction. Through the action of the link 22, as well known in the art, approximately the first half of the running down movement of the master member will swing the blade ring 16 counterclockwise to open the blades. At approximately the same moment that the blades reach fully open position, the shoulder or abutment 20c on the master member will strike the surface 38a of the bellcrank lever 38, with the result that further running down movement of the master member is temporarily obstructed in this position in which the shutter blades are fully open, until such time as the obstructing bellcrank lever 38 can move aside and allow the master member to continue its running down movement.

This cannot be done, however, until the electromagnet 46 is energized to attract the armature 40 to release the bellcrank lever 38 so that it may move aside. The initial movement of the blade ring 16 from blade-closed position to blade-open position has moved the pin 16b which controls the changeover switch 62, so that this switch 62 has opened the contact with the member 62a and has closed the contact with the member 62b. As soon as the contact with the member 62b is made, the battery 50 commences to charge the capacitor 60 through the adjustable resistance 58, which in the example given will be the resistance 58e corresponding to the exposure time 1/30th of a second. The selected resistance 58 plus the capacitor 60 together constitute the RC member or part of the control circuit. After a lapse of time determined by the values of these elements 58 and 60, the charge of the capacitor 60 exceeds the breakdown voltage of the four-layer diode 64, so that the charge in the capacitor 60 can then discharge through the diode 64 and the electromagnet winding 46. This energizes the second electromagnet 46 to attract its armature 40, thereby releasing the bellcrank 38. The pressure of the master member against the arm 38a of the bellcrank will then turn the bellcrank clockwise on its pivot 38b as soon as the armature 40 moves to unlatching position, so the master member 20 can now resume its running down travel in a counterclockwise direction, pulling the blade ring 16 back in a clockwise direction to close the shutter blades.

Suppose, however, that the operator sets the manual control 36a in a position for taking a picture at a shutter speed of 1/250, which is the position illustrated in FIG. 1. This will bring the slide members 36 and 68 to the full line positions shown in FIG. 2. This will immediately light the telltale or warning lamp 78, through the connections illustrated in FIG. 2; that is, from the battery 50 through the conductor 70, slide 68, conductor 72b, prong B, conductor 80, prong W, to the lamp 78, and from the other side of the lamp 78 to the other side of the battery 50. This lighting of the warning lamp 78 will continue as long as the setting member 36a remains in a position calling for an operation which the shutter is incapable of performing. The same effect is produced if the setting member 36a is moved to the position for an exposure of 1/500th of a second, or to a position for any other exposure which the shutter cannot make. The illumination of the lamp 78 warns the operator that he cannot make the intended exposure, and that he must set the manual selector 36a to some other position which is within the capabilities of the particular shutter which is being used.

If the operator accidentally overlooks the warning given by the telltale lamp 78 and nevertheless attempts to depress the trigger button or plunger 82, the mechanism is locked so that the shutter cannot be operated. At the same time that the warning lamp 78 becomes illuminated, current also begins to flow through the electromagnet winding 76, thereby attracting the armature 76a to move the locking lever 86c to a position obstructing the trigger plunger 82, so that it cannot be depressed far enough to close the switch 56 and initiate the operation of the shutter. When the manual selector 36a is moved to another position within the range of capability of the shutter, then current to the conductor 80 is cut off and the lamp 78 goes out and the electromagnet winding 76 is de-energized, so that the trigger button 82 can be operated.

Figure 3:
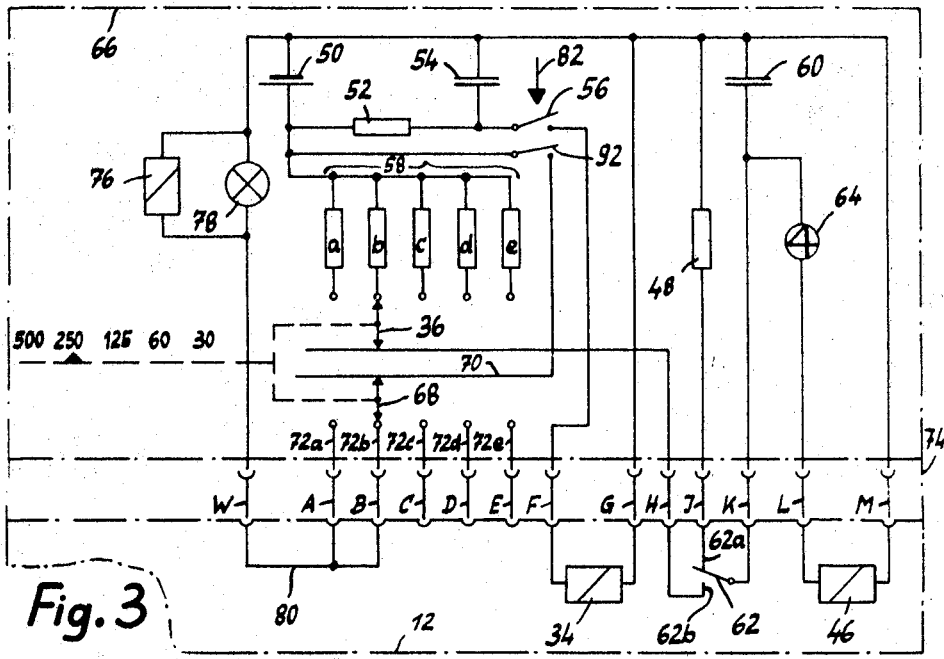
FIG. 3 is a view similar to FIG. 2, showing another embodiment.

FIG. 3 illustrates another embodiment of the invention, in which the warning lamp 78 is not illuminated and the electromagnet 76 is not energized until an attempt is made to depress the trigger button 82. This avoids undesired drain on the battery which would occur, in the first embodiment of the invention, if the manual control member 36a were inadvertently allowed to remain for a protracted time in a position corresponding to an exposure which could not be made by the shutter. In this second embodiment, the main parts of the construction are the same, and the description thereof need not be repeated. This second embodiment includes a second switch 92 adapted to be operated by the trigger or trip button 82 upon slight initial movement thereof, before the button has moved far enough to close the other switch 56. The contact member 70, which is connected to one side of the adjustable slide 68, leads directly from the battery in the first embodiment (FIG. 2) but in the second embodiment (FIG. 3) it comes through the switch 92, so current is not supplied to the contact member 70 unless the switch 92 is closed. Except for this, the construction may be the same as previously described.

In this second embodiment, the mere act of moving the adjusting member 36a to a position outside the range of capability of the shutter, will not cause the lamp 78 to be illuminated nor the magnet 76 to be energized. However, assuming that the selector has been set to a position outside the permissible range, then as soon as the button 82 starts its downward movement, the switch 92 is closed, so that the warning lamp 78 is illuminated and the locking magnet 76 is energized immediately, to block further downward movement of the plunger 82 before the plunger can move far enough to close the switch 56 which starts the operation of the exposure cycle of the shutter.

Some of the conductors and other parts of the circuitry shown in FIGS. 2 and 3 have not been specifically mentioned in the foregoing description, because it is believed that those skilled in the art will have no difficulty in understanding the construction from the wiring diagrams of FIGS. 2 and 3, in the light of what has been specifically said in the description.

As already briefly indicated, the invention may be used in connection with the control of any variable factors of interchangeable shutters. Merely as an example, the arrangement has been disclosed in connection with the setting of shutter speeds, but it is equally applicable to the setting of selected diaphragm apertures, and also to the conjoint setting of both shutter speeds and diaphragm apertures in what is known as a programmed shutter wherein a particular shutter speed is normally associated with a particular diaphragm aperture. Also, the principles of the invention may be used with other types of electronic arrangement, or in connection with shutters having mechanical trip or trigger means. Also, a locking arrangement on the same principle as the locking lever 86 may be used to block the movement of the manually settable member 36a to a position outside the permissible range of the shutter, so that the movement of the setting member 36a will be prevented if it is attempted to move it to a position which would call for an operation of the shutter which the shutter is incapable of performing.

It is to be understood that the disclosure is given by way of illustrative example only, rather than by way of limitation, and that without departing from the invention, the details may be varied within the scope of the appended claims.

We claim:

1. A photographic camera assembly comprising, in combination, an interchangeable shutter unit having a variable factor settable to a series of values within a range, an electric control unit operatively connectable to any one of a plurality of interchangeable shutter units and having movable setting means operable in conjunction with means in the shutter unit with which it is connected for setting said variable factor of the connected shutter unit to any selected one of the settable values thereof, warning signal means in said control unit, and electric circuit connections partly within said shutter unit and partly within said control unit for activating said warning signal means as a result of movement of said movable setting means to a position for setting the variable factor of the connected shutter unit to a value outside of the available range of values thereof.

2. A construction as defined in claim 1, in which said settable variable factor is shutter speed.

3. A construction as defined in claim 1, in which said means for setting said variable factor includes a resistance-capacitance circuit having a capacitor charged through a selected one of a plurality of resistances selected by said movable setting means, and in which said connections for activating said warning signal means include a plurality of separate electrical conducting members in said control unit, one corresponding to each of said plurality of resistances and one forming part of said warning signal means, and electrical connections in said shutter unit for connecting said conducting member forming part of said warning signal means to the conducting members corresponding to any of said resistances which are ineffective for setting a corresponding variable factor of the particular shutter unit then connected to said control unit.

4. A construction as defined in claim 1, wherein said warning signal means includes a lamp.

5. A construction as defined in claim 1, in which said control unit includes a switch adapted to be closed to initiate an exposure cycle of said shutter, and in which said warning signal means includes blocking means for blocking the closing of said switch.

6. A construction as defined in claim 1, in which said control unit includes an actuating member which, when moved, closes a first switch and upon further movement closes a second switch, and in which said first switch controls said warning signal means and said second switch, when closed initiates an exposure cycle of said shutter, and in which said warning signal means includes blocking means for blocking movement of said actuating member sufficiently far to close said second switch.

7. A photographic camera assembly comprising:
 a. an electric control unit for controlling operation of any one of a plurality of shutter units which may be interchangeably used with said control unit;
 b. an electrically controlled shutter unit adapted to be controlled by said control unit;
 c. said control unit and shutter unit including disengageable electric plug connections for establishing electric circuits between said control unit and the particular interchangeable shutter unit which is to be operated thereby at a particular time, to provide an operative connection between said units;
 d. said shutter unit being capable of variable operation in accordance with any selected one of a plurality of values within a range;
 e. said control unit including means for selecting a particular value within the available range of values of a particular shutter connected to said control unit and also selecting a value outside of the available range of values of said particular shutter but within the range of values of another shutter which may be interchangeably connected to said control unit;
 f. said selecting means on said control unit including a setting member movable to various positions corresponding to various values to be selected;
 g. a separate electric circuit conductor from said control unit through said disengageable plug connections to said shutter unit for each separate position of said setting member;
 h. warning signal means in said control unit;
 i. a warning signal conductor extending from said warning signal means in said control unit through said disengageable plug connections into said shutter unit;
 j. a circuit connection in said shutter unit for establishing electrical connection between said warning signal conductor and each of said separate circuit conductors which correspond to a position of said setting member which is outside the available range of values of the particular shutter; and
 k. means for supplying electric current to the separate electric circuit conductor corresponding to the position of said setting member, so that if such position is outside the available range of values of the particular shutter then connected to said control unit, current will be supplied to said warning signal means through said circuit connection in said shutter unit, thereby to activate said warning signal means.

8. A construction as defined in claim 7, wherein said control unit further includes a switch member movable to close a switch for initiating an exposure cycle, and wherein said warning signal means includes means blocking movement of said switch member to closed position when said warning signal means is activated.

9. A construction as defined in claim 7, wherein said means for supplying current to the separate electric circuit conductor is effective to supply current thereto immediately upon movement of said setting member to a position corresponding to such separate electric circuit conductor.

10. A construction as defined in claim 7, wherein said control unit further includes a switch member movable to one extent to close a first switch and movable to a further extent to close a second switch for initiating an exposure cycle, and wherein said means for supplying current to the separate electric circuit conductor includes a circuit passing through and controlled by said first switch, so that current is not supplied to said separate electric circuit conductor unless and until said switch member is moved to an extent sufficient to close said first switch.

11. A construction as defined in claim 1, in which said shutter unit is in one housing and said control unit is in a separate housing externally of the housing of said shutter unit, and in which the electric circuit connections include a conductor cable having a separable plug connection with one of said housings.